March 1, 1966     H. E. WILKINS     3,237,577

AMMONIA APPLICATOR

Filed Dec. 9, 1963     2 Sheets-Sheet 1

INVENTOR.
HUGH E. WILKINS

BY Robert E Breidenthal

ATTORNEY

March 1, 1966  H. E. WILKINS  3,237,577

AMMONIA APPLICATOR

Filed Dec. 9, 1963  2 Sheets-Sheet 2

INVENTOR.
HUGH E. WILKINS

BY Robert E. Breidenthal
ATTORNEY

United States Patent Office 3,237,577
Patented Mar. 1, 1966

1

3,237,577
AMMONIA APPLICATOR
Hugh E. Wilkins, Box 169, Blackwell, Okla.
Filed Dec. 9, 1963, Ser. No. 329,017
8 Claims. (Cl. 111—7)

This invention relates to new and useful improvements in agricultural apparatus for subsurface introduction of treating fluids into the earth, and more particularly pertains to new and useful improvements in apparatus for introducing liquid fertilizer or ammonia into the ground such as disclosed in U.S. Patent No. 2,912,944 issued to R. D. Snow et al., November 17, 1959.

Numerous proposals have heretofore been made in connection with apparatus for introducing treating agents into the ground. Such prior proposals are exemplified by the above-mentioned patent and the following listed United States Patents: 2,598,121 issued May 27, 1952 to Hannibal, 2,684,617 issued July 27, 1954 to Johnston, 2,722,902 issued November 8, 1955 to Hyatt, 2,781,733 issued February 19, 1957 to Graham, 2,888,891 issued June 2, 1959 to Ackley, Re. 25,307 issued December 25, 1962 to Johnston, and 1,924,075 issued August 22, 1933 to Olson.

The disclosures (drawings and specifications) of the above-listed patents and U.S. Patent No. 2,912,944 are of interest as to the structure, functions and purposes of agricultural earth treating apparatus and to the extent such disclosures are pertinent to equivalents (or accessory apparatus that can be employed along with the apparatus of this invention) for components of the invention hereinafter disclosed and claimed, such disclosures are herein incorporated by reference, though equivalence insofar as the invention hereinafter disclosed and claimed is not to be considered by implication to be limited to such disclosures, the latter having been presented by way of example only to facilitate an understanding of the art.

The primary object of the present invention is to provide apparatus that will enable the introduction of liquid or fluid earth treating agents into the earth at a position below the surface thereof in such a manner as to minimize insofar as possible disturbance of the earth's surface and growing plants, and so that a minimum loss of treating agent is incurred particularly when the latter is of volatile character.

Another important object of the present invention is to provide apparatus of the character indicated above that will be relatively free from accumulating a load of or becoming clogged by trash lying on the earth's surface or buried below the earth's surface at a depth less than that at which the treating agent is introduced.

Still another object of the invention is to provide apparatus of the character set forth above such that a minimum of power is required for a given rate of earth treatment.

A very important object of the instant invention is to realize as uniform a degree of earth treatment along the entire length and breadth of the area treated as possible, and to enable optimum maneuverability and utilization of the earth treating equipment over ground that may be uneven or contain rocks without subjecting the equipment to excessive stresses or incurring a probability of equipment damage or breakdown.

Yet another object of the invention is to provide a treating unit or accessory, such that one or more of such treating units can be readily and removably attached to a basic wheel mounted machine (which can be of utility in connection with other forms or types of accessories such as insecticide sprayers and so forth), whereby an economy as to the basic machine can be effected by extending the functions thereof and whereby replacement of worn units can be conveniently made, and so a damaged or worn unit can be separately transported to a repair shop.

A broad aspect of the invention comprises a blade and fluid conduit construction adapted for subsurface introduction of earth treating fluids, such construction comprising an elongated blade of generally rectangular cross section having forward and rear edges, and an earth penetrating end, said end being substantially straight and defining respectively acute and obtuse angles with the forward and rear edges of the blade, said blade being of enlarged thickness immediately adjacent and along said end from the rear to the forward edges thereof, a fluid conduit extending along the rear edge of the blade and terminating in a closed end adjacent said end of the blade, said conduit being of less diameter than the thickness of the enlarged end of the blade, and said conduit having lateral openings adjacent said enlarged end of the blade. This aspect of the invention can optionally include in addition a holder for said blade, such blade being slidingly received by said holder for longitudinal reciprocation of the blade, and means for securing the blade relative to the holder.

Another broad aspect of the invention relates to a treating unit, a multiplicity of such units being adapted for use in a single machine, each of such treating units involving the improvement comprising an elongated frame having front and rear ends, means for pivotally mounting the frame for vertical swinging movement of the rear end of the frame about a horizontal axis adjacent the front end of the frame, spring means adapted for yieldingly urging downward swinging movement of the rear end of the frame, such spring means comprising an elongated leaf spring generally parallel to the frame having front and rear ends, means for operatively bearing the front end of the spring on the front end of the frame, means for operatively bearing the rear end of the spring on the rear end of the frame, a colter wheel pivotally mounted on the frame intermediate the ends of the latter for rotation about a horizontal axis parallel to the first-mentioned axis, said wheel being substantially flat, having a sharp-edged periphery and being essentially knife-like through a substantial portion of its outer radial extent, a forwardly and downwardly inclined blade carried by the frame adjacent the rear end of the latter, said blade being coplanar with and rearward of the wheel, said blade having its lowermost extremity vertically disposed at a height in the height range from below the lowermost part of the wheel to a position about midway between the axis of the wheel and the lowermost part of the latter, and fluid conduit means carried by the blade having an outlet adjacent the lowermost extremity of the blade. Preferably, this aspect of the invention involves the leading or forward edge of the blade being blunt and of greater transverse thickness than the outer portion of the colter wheel, and/or the blade being selectively securable in a longitudinally adjusted position.

Another version of the invention pertains to an improvement in agricultural apparatus for subsurface introduction of treating fluids into the earth and improvement comprising a main frame, a pair of axially aligned, axially spaced, ground support wheels mounted for vertical movement on said main frame, means for vertically moving said support wheels relative to the main frame and for securing said support wheels in a selected vertically adjusted position, a plurality of treating units carried by the main frame, such units being disposed along the main frame at positions spaced in parallelism to the axis of the support wheels with such units being located intermediate and at both sides of the pair of support wheels, each of said units being comprised of a subframe disposed below the main frame, such subframe being generally horizontally disposed and elongated in a direction at right angles to the axis of the support wheels, said subframe having forward and rear ends with the same being pivoted for vertical swinging movement to the main frame adjacent the forward end of the subframe with such pivotal connection being substantially forward of the axis of the support wheels throughout vertical movement of the latter, spring means urging downward swinging movement of the rear end of the subframe relative to the main frame, means for limiting downward swinging movement of the rear end of the subframe relative to the main frame, a generally flat colter wheel mounted on the subframe about a horizontal axis approximately as advanced relative to the main frame as the axis of the support wheels, said colter wheel having a sharp-edged periphery and being of an axial thickness not exceeding about one-half inch thickness along every radius thereof from a position spaced from the axis of the colter wheel a distance not exceeding two-thirds of the maximum radial extent of the colter wheel to the sharp-edged periphery thereof, a depending blade carried by the subframe rearwardly of and coplanar with the colter wheel, said blade being forwardly and downwardly inclined and projecting below the adjacent and trailing edge of the colter wheel, fluid conduit means carried by the blade having an outlet adjacent the lowermost extremity of the blade, a treating fluid storage vessel carried by the main frame, and means coupling the vessel to all the conduit means of the treating units for delivering a treating fluid to such conduit means.

Still another aspect of the invention relates to an improvement in agricultural apparatus for subsurface introduction of treating fluids into the earth, such improvement comprising a frame, a substantially flat colter wheel mounted on the frame for rotation about a horizontal axis, said wheel having a sharp-edged, knife-like periphery and being of an axial thickness not exceeding about one-half inch along every radius thereof from a radial position spaced from the axis of the wheel a distance not exceeding two-thirds of the maximum radial extent of the wheel to the sharp-edged periphery thereof, whereby the colter wheel can be rolled to slice and cut through earth to a depth at least as great as one-third of the maximum radius of the wheel with the production of a minimum width opening in the earth, a depending blade carried by the frame rearwardly of and coplanar with the wheel, said blade being forwardly and downwardly inclined and projecting below the adjacent and trailing edge of the wheel, with the lower extremity of the blade being vertically positioned at a level within a vertical height range from below the lowermost part of the wheel to said radial position, and fluid conduit means carried by the blade having an outlet adjacent the lowermost extremity of the blade.

Yet another aspect of the invention involves a treating unit for releasable attachment to a wheel mounted machine, said treating unit comprising an elongated frame having front and rear ends, a mounting bracket adapted to be releasably secured to a wheel mounted machine, means pivotally connecting the frame adjacent its front end to the bracket about a horizontal axis transverse to the longitudinal extent of the frame for vertical swinging movement of the rear end of the frame, a substantially flat colter wheel having a sharp-edged periphery mounted on the frame adjacent the rear end of the latter for rotation about an axis parallel to said horizontal axis, spring means adapted to coact with a wheel mounted machine for urging downward swinging movement of the rear end of the frame including an elongated leaf spring overlying the frame and the colter wheel, a blade carried by the rear end of the frame, said blade having a lower extremity disposed below a part of and coplanar with the colter wheel, and conduit means carried by the blade having an outlet adjacent the lower extremity of the blade.

A very important feature of the present invention is that the colter wheel is substantially flat as shapely contrasted with being dished or wedged-shaped, and is of essentially minimal thickness for a very substantial portion of the radial extent of the wheel adjacent the outer periphery thereof, it being desired that the wheel be of very thin construction for the entire extent to which the same penetrates the ground. Futhermore, it is desired that the outer periphery of the colter wheel be sharp-edged so as to cut trash encountered by either on the surface of the ground or below the surface thereof, rather than to thrust such trash laterally or down into the ground.

A very important feature of the invention is the independent mounting of the individual treating units, whereby such treating units can move upwardly or downwardly independently so as to maintain a maximum degree of uniformity of earth treatment even when the earth surface is uneven and/or the ground varies in hardness or the degree of ease with which the ground may be penetrated by the colter wheels. Also the individual and resilient mounting of the units allows the latter to raise up and ride over obstructions such as rocks, etc., with minimum likelihood of damage.

Yet another very important feature of the invention is the character of the blade being such that trash encountered thereby tends to be cammed upwardly and rearwardly so that the same may fall laterally from the blade, as contrasted with blades of sharp leading edges which simply tend to fold trash thereabout and carry the same along with the blade.

Still another important feature of the blade construction resides in the blade being forwardly and downwardly inclined so as to terminate at its lower end below the trailing edge of the colter wheel, and the blade being enlarged in transverse thickness along a horizontal line immediately preceding the lateral discharge outlets of the conduit carried by the blade.

An important feature of the invention also resides in the subframes of the individual treating units being elongated and generally horizontally disposed, in an arrangement such that the motion of the individual colter wheels is substantially vertical and so that the axles of the colter wheels lie generally in the same vertical plane as the axles of the ground support wheels when the latter are raised as during the use of the apparatus, with the result that lateral thrust on the colter and support wheels occurs on turning the apparatus. Closely allied to this specific feature is the provision of a leaf spring for yieldingly urging downward swinging movement of the colter wheel in an arrangement such that yielding resistance offered to upward swinging movement of the colter wheel increases at substantially one linear rate until the colter wheel has reached a predetermined position in its upward swinging movement, and thereafter increases at a higher linear rate.

Other objects, aspects, features and advantages of the invention will become apparent during the following description of a preferred embodiment of the invention taken in conjunction with the accompanying drawings illustrative of such preferred embodiment of the invention, wherein.

Figure 1:
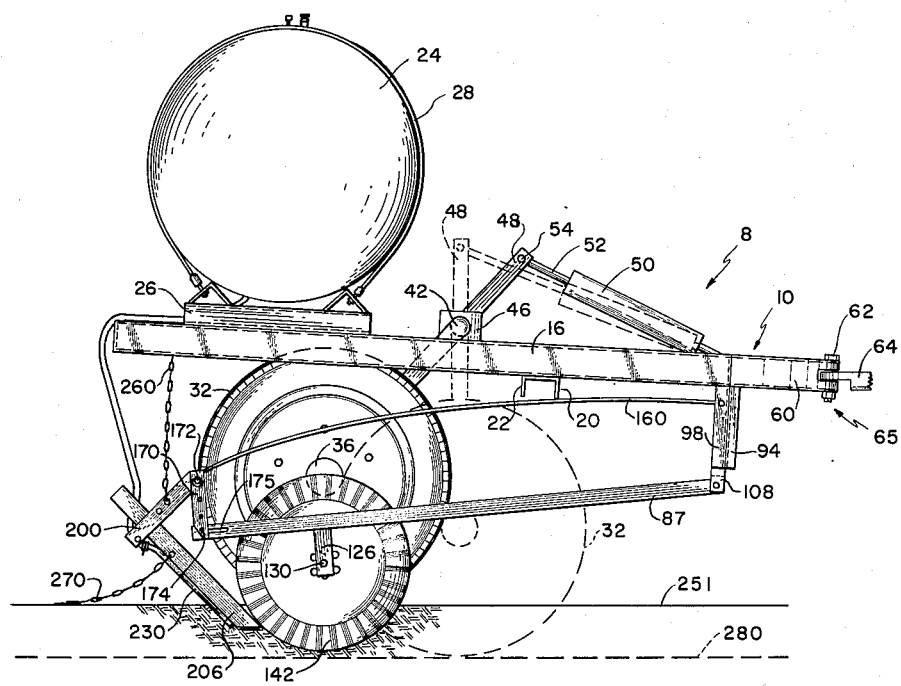
FIGURE 1 is a side elevational view of apparatus constructed according to the invention, alternative positions of various parts being illustrated in dashed lines.

Referring now to the drawings, wherein like reference numerals designate like parts throughout the various views, the reference numeral 8 designates the apparatus of the invention generally.

Figure 3:
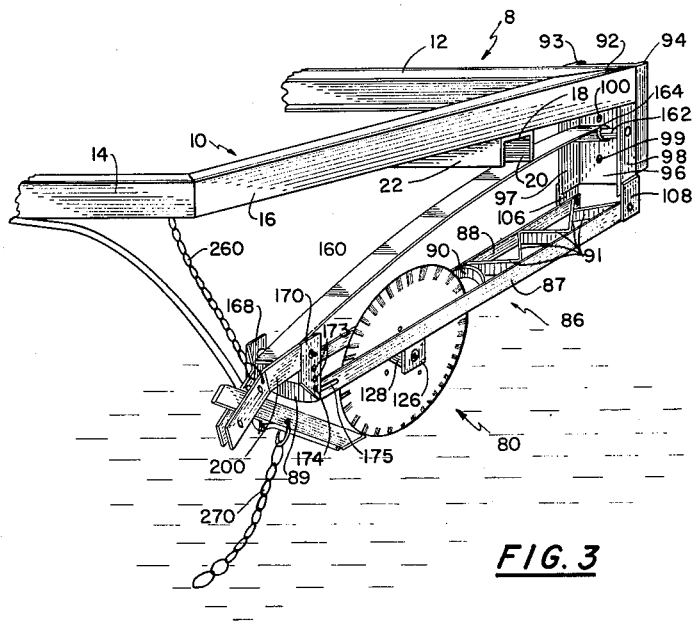
FIGURE 3 is an isometric view of one of the treating units, the same being shown with the colter wheel fully exposed above the ground.

The apparatus 8 is comprised of a main frame 10 formed of elongated forward and rear transverse members 12 and 14 connected by a plurality of parallel longitudinally extending cross braces such as the one shown at 16 in FIGURE 3. It will be understood that a sufficient number of cross braces 16 are employed to afford a substantially rigid and rectangular frame 10. Preferably, such frame 10 is made of channel iron members with joints being securely welded together. Extending transversely beneath the main frame 10 and forming a part thereof is an elongated channel member including a web 18 and flanges 20 and 22. The channel member comprised of the web 18 and flanges 20 and 22 extends below the cross members 16 and the web 18 is securely welded to such cross members 16, it being noted that the channel shaped member 16 is disposed with the web 18 uppermost and the flanges 20 and 22 depending therefrom for a reason subsequently to become apparent. It will also be noted for reasons to become apparent hereinafter that the channel 16 is disposed intermediate the longitudinal extent of the cross members 16 and rearwardly of the member 12.

A transversely disposed cylindrical tank or storage vessel 24 is securely mounted on the main frame by means of a conventional cradle construction 26 and securing straps 28. As will be evident on inspection of FIGURE 2, the storage vessel 24 is centrally disposed with respect to the transverse extent of the main frame 10.

A vertically adjustable ground wheel support system is provided for the main frame of the apparatus 8, such system comprising a pair of ground support wheels 30 and 32 that are transversely spaced and symmetrical with respect to the transverse configuration of the apparatus 8. The ground support wheels 30 and 32 are rotatably mounted on axles 34 and 36 that are in alignment and carried at the lower ends of the legs 38 and 40 of a U-shaped wheel support frame that includes a central transversely extending web or bight section 42 journaled in pillow bearings 44 and 46 mounted securely on the frame 10. The arrangement is such that rotation of the U-shaped frame comprised of the legs 38 and 40 and the web or bight portion 42 in the pillow bearings 44 and 46 causes the wheel 32 and the axle 36 thereof to move from the full line position shown thereof in FIGURE 1 to the positions thereof shown in dashed outline in FIGURE 1, it being understood that throughout the vertical range of movement of the ground support wheels 30 and 32 that they remain in axial alignment.

Means is provided for effecting the above-described vertical movement of the wheels 30 and 32 about the axis of the bight or web portion 42 of the U-shaped frame, and such means comprises an upstanding arm 48 fixedly secured to the center of the bight or web portion 42 of the U-shaped frame, together with a double-acting hydraulic cylinder means acting between the upper end of the arm 48 and the member 12 of the frame 10 to effect rotation of the web or bight portion 42 of the U-shaped frame. The character of such hydraulic means in relation to the arm 48 is shown in FIGURE 1, wherein a double-acting hydraulic cylinder 50 has its forward end pivotally connected to the main frame member 12, and the extended end of the piston rod 52 of such double-acting hydraulic cylinder 50 is pivotally connected to the upper end of the arm 48 as indicated at 54. With this arrangement, the double-acting hydraulic cylinder 50 can be hydraulically actuated by conventional means, not shown, whereby the piston rod 52 can be forcibly extended to rotate the arm 48 from the full line position shown thereof in FIGURE 1 to the position shown thereof in dashed outline, thereby to move the wheel 32 from the full line to the dashed line position shown thereof in FIGURE 1. Conversely, the hydraulic cylinder 50 can be hydraulically actuated by the aforesaid conventional means to retract forcibly the piston rod 52 and move the wheel 32 from the dashed position thereof to the full line position. It will be appreciated by those skilled in the art that actuation of the hydraulic cylinder 50 can be stopped at any intermediate position of extension or retraction of the piston rod 52 so as to hold the wheel 32 at either of the extreme positions shown thereof in FIGURE 1 or at any intermediate position.

The frame 10 of the apparatus 8 includes a forwardly projecting tongue section 60 that is suitably secured as by welding or the like to the frame member 12, and such tongue 60 can be releasably connected by a draft pin 62 to a tow bar 64 (partially shown in FIGURE 1) of any draft vehicle such as a truck or tractor by a conventional clevis structure indicated generally at 65. Although not shown, it will be well within the skill of the art to appreciate that the forward end of the tongue 60 can alternatively be provided with a vertically fixed pair of transversely spaced ground support wheels, with a prime mover and steering system carried by the frame 10 operatively connected to such wheels, this arrangement being deemed a self-propelled equivalent for the illustrated and described arrangement whereby the apparatus 8 can be towed.

Figure 2:
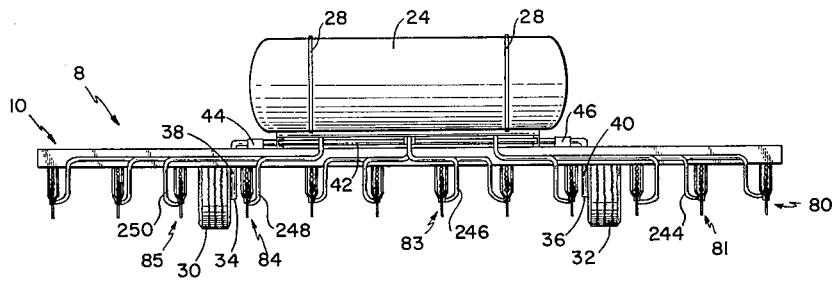
FIGURE 2 is a rear elevational view of the apparatus shown in FIGURE 1 taken on a reduced scale.

As shown in FIGURE 2, a plurality of earth treating units are carried by and transversely spaced along the entire transverse extent of the apparatus 10, some of such substantially uniformly spaced earth treating units being designated generally at 80, 82, 83, 84 and 85. It will be noted that such earth treating units are disposed intermediate the ground support wheels 30 and 32 such as are units 83 and 84, and that some of such earth treating units are disposed on the opposite sides of the pair of support wheels 30 and 32 as are units 80 and 85. Inasmuch as all of the earth treating units are substantially identical, a detailed description of the earth treating unit 80 will suffice for all of such earth treating units.

The earth treating unit 80 comprises an elongated, generally horizontally disposed subframe 86 formed of a continuous shaped member of strap iron having sides 87 and 88 connected by a web or bight section 89. Forwardly from a position spaced in advance of the bight section 89, the sides or legs 87 and 88 are internally braced by an arcuate strap iron element 90 and zigzag strap iron cross bracing 91 welded to the sides or legs 87 and 88.

A short length of channel iron comprised of a web 92 and flanges 93 and 94 is rigidly fixed as by welding to the leading side of the web of the channel member 12 so as to extend vertically a short distance below the channel member 12.

A channel member comprised of a web 96 and flanges 97 and 98 is releasably secured to the web 92 by bolts 99 and 100 extending through the webs 92 and 96. This channel member can be made of the same stock as the channel comprised of the web 92 and flanges 93 and 94, and in such event, depending straps 106 and 108 are secured by welding to the flanges 97 and 98. The forward ends of the sides or legs 88 and 87 are received between the straps 106 and 108 and removable pivot pins 110 and 111 parallel to the frame member 12 are journaled through the strap 106 and the leg 88 and the strap 108 and the leg 87, respectively, whereby the subframe 86 can be swung vertically about the horizontal and transverse axis of the pivot pins 110 and 111. If desired or deemed expedient, means can be provided for lubricating or otherwise diminishing friction about the pivotal connections defined by the pivot pins 110 and 111; however, the expense of such additional provision has not been found to be necessary. The pivot pins 110 and 111 can be retained in assembled position for removable replacement by means of cotter pins, not shown.

Figure 4:
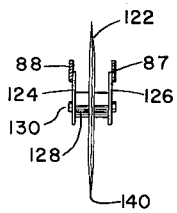
FIGURE 4 is an edge on view on a reduced scale of the colter wheel and the mounting thereof on the subframe.
Figure 5:
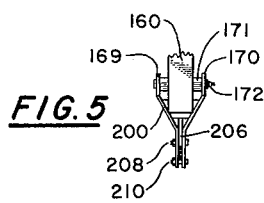
FIGURE 5 is an enlarged, broken elevational view of the rear end of a treating unit.

The space intermediate the web or bight 89 and the arcuate element 90 between the legs 87 and 88 accommodate a colter wheel designated at 122. As best shown in FIGURE 4, a pair of straps 124 and 126 are suitably secured as by welding or the like to the legs 87 and 88 so as to depend therefrom at a position intermediate the longitudinal extent of the space between the bight 89 and are arcuate element 90. The hub section 128 of the colter wheel 122 is disposed between the lower end portions of the straps 124 and 126 and is secured thereto for rotation about a horizontal axis 130 that is disposed somewhat below the subframe 86 in parallelism to the pivot pins 110 and 111 and the extent of the frame member 12. This affords increased clearance between the subframe 86 and the ground when the colter wheel 122 is in the ground. It is preferred that the rotary mounting for the colter wheel 122 comprised of the hub structure 128 and the wheel mounting pin or axle 130 be of such character as to resist the ingress of dirt and moisture as would deleteriously affect such rotary mounting. Sealed bearings (hidden within the hub 128) are well known in the art and a full understanding thereof will be immediately evident to those familiar with conventional agricultural equipment.

A very important feature of the invention is that the colter wheel 122 be as thin as possible for the entire outer radial portion of its extent that is to penetrate the ground. Also, it is extremely important that the peripheral edge 140 of the colter wheel 122 be sharp-edged or knife-like and of such character as to cut with optimum efficiency not only the ground, but also trash such as plant stocks, leaves, twigs and the like that are disposed either on the surface of the ground or disposed below the ground surface. For this purpose it is preferred that the colter wheel 122 be provided with a corrugated or serrated peripheral margin portion 142 such as is conventional and is marketed by Ingersoll Products Division of the Borg-Warner Corporation of Chicago, Illinois, under the trademark "Dura-Flute." It has been found that such preferred outermost configuration of the colter wheel 122 greatly facilitates the desired cutting action while opening a crack of minimum width in the ground surface even when the colter wheel 122 is being operated so as to penetrate the earth to a substantial proportion of the maximum radius of the colter wheel 122. Also such corrugated structure resists stalling by trash against rotation. Contrary to the teachings of the prior art indicating the desirability for using wheels that increase substantially and usually progressively in thickness from the outer periphery thereof in connection with means for introducing a fluid treating agent into the ground, it has been found that the use of a colter wheel indicated preferably above in connection with such equipment reduces the loss of volatile treating agents and enables equipment to be used at the time of optimum fertilizer effectiveness, namely, as a top dressing at the end of the dormant period or for side dressing row crops after ground thaws. Equally as important, such colter wheel disturbs growing plants to a far less detrimental extent such as ordinarily has heretofore occurred in the use of such equipment when top dressing crops such as wheat or other grains at an early stage of plant development. This is also true in the side dressing of row crops such as maize or corn when about a foot in height.

Notwithstanding the preference indicated previously for a colter wheel having an outer marginal portion of corrugate or fluted character, the colter wheel 122 can alternatively be essentially flat and smooth (not fluted or corrugated), it again being emphasized that it is very important that the thickness of the colter wheel in either case be substantially thin for a considerable portion of the outer radial extent of the colter wheel. Another advantage of the use of a very thin colter wheel is that trash encountered by the colter wheel does not tend to be thrust down into the ground or laterally so as to possibly damage tender young plants, but additionally such thin type colter wheel as contrasted with a wedge-shaped wheel does not tend to laterally compact the soil (so as to reduce the permeability or absorptive characteristics thereof), and also the same does not tend to open such a cut or ditch that may normally be expected to have raised sides fairly widely spaced apart, which would necessitate the use of a scraper or wheel to reclose the opening. Obviously vigorous steps to close an opening or ditch tends to compact the soil and quite probably damage tender young plants.

The use of the term "thin" will be readily appreciated upon understanding that excellent results have been obtained in practice using a colter wheel of 18 inches diameter wherein the axial thickness of the wheel is only 145 thousandths of an inch at the hub juncture. The use of the expression "sharp-edged or knife-like periphery" will be better understood on appreciation that the outermost three radial inches of such wheel smoothly tapered from 145 thousandths of an inch in axial thickness to virtually zero thickness at the edge.

Whether the outer radial margin of the colter wheel 122 be smooth or corrugate it is to be clearly understood that the colter wheel 122 must in its outer radial margin for an extent equal to the maximum depth of earth penetration be, for optimum results, axially thin and subtend at most a very sharp angle at the peripheral edge of the wheel. In other words, the shape should be such as to open a cut in the earth that is narrow and of nearly parallel vertical sides as contrasted with a V-shape or wedge-shaped cut. Such angle should be less than 5° at most and about 1° to about 3° being preferred. A value of about 1½° being especially preferred.

While results of some value can be obtained using wheels of an axial thickness of even more than ½ inch in the marginal earth penetrating portion, such thickness is to be avoided if the results are to reasonably approximate the maximum attainable in the practice of the invention. Tough high carbon steels such as used in extant wheels of the type previously identified enable very thin wheels to be used. The earth penetrating marginal portion of the wheel preferably such as not to exceed about ½ inch maximum axial thickness at its nearest approach to the wheel axis, and should lie in the range of about 100 thousandths to about 300 thousandths with about 145 thousandths being especially preferred.

When referring to "earth penetrating marginal portion," reference is being made to the entire outer radial extent of the wheel which is intended to penetrate the earth, and the inner part of such portion can be adjacent the hub.

When referring to "axial thickness," reference is made to the axial dimension of the wheel at a particular point rather than the over-all thickness, this consideration being of significance primarily in determining the "axial thickness" of the wheel in a fluted or corrugated region.

Not only can the outer peripheral marginal portion of the colter wheel be smooth or of corrugate or fluted character, but in either case the outer periphery can be toothed or serrated (not shown) if desired so that minor regular variations in radius occur about the circumference of the wheel. Such alternative peripheral configuration does not obviate the requisite thinness of the wheel for optimum results.

A machine embodying principles of the instant invention and employing a smooth colter wheel of 145 thousandths inch thickness is disclosed in an article entitled Nitrogen For the Small Grain Fields of Oklahoma appearing on pages 20, 22 and 23 of the July-August 1963 issue of the periodical Agricultural Ammonia News, and such article and the cover page photograph of such issue are incorporated herein as supplemental disclosure by reference.

Means is provided for yieldingly urging downward swinging movement of the colter wheel 122, such means comprising an elongated leaf spring 160 (SAE 5610 heat treated, high carbon spring steel) disposed above the subframe 86. The forward end of the leaf spring 160 is secured about a pin 162 as indicated at 164. The opposite ends of the pin 162 are secured in any suitable manner to the flanges 97 and 98.

The leaf spring 160 is upwardly convex and extends rearwardly from the pin 162 intermediate the subframe 86 and the channel constituted of the web 18 and the depending flanges 20 and 22, with the rear end portion of the leaf spring 160 being disposed directly above the colter wheel 122 (so as to serve additionally as a protective cover therefor and as a safety feature for a machine operator) and the rear end of the spring 160 is received between the upper ends of a pair of straps 169 and 170 to bear downwardly against a tubular sleeve 171 journaled on a bolt 172 extending between the straps 169 and 170. The vertical and generally parallel spaced straps 169 and 170 are provided with vertically spaced openings 173 and are adjustably secured to the sides or legs 88 and 87 of the subframe 86 adjacent the web or bight portion 89 of the latter by bolts 174 extending through selected openings 173 and elongated slots 175 in the legs 88 and 87. This structure enables the straps 169 and 170 to be selectively and releasably secured in adjustment upwardly and downwardly, forwardly and rearwardly, as well as in inclination from the vertical.

It will be apparent upon inspection of FIGURE 3 that an intermediate portion of the longitudinal extent of the spring 160 bears against the underside of the lower edge of the flange 20, so as to urge downward swinging movement of the subframe 86 and the colter wheel 122 carried thereby. It will be also evident on further inspection of FIGURE 3 that a predetermined upward swinging movement of the subframe 86 from the position shown thereof in FIGURE 3 will cause the leaf spring 160 to engage the lower edge of the flange 22, whereby a greatly increased rate of yielding resistance to further upward swinging movement of the subframe 86 will occur. In otherwords, the resilient resistance to upward swinging movement of the subframe 86 is greatly lessened, and this result is achieved without incurring too much variation in the amount of spring pressure applied to the subframe 86 when the latter is swinging within the lower and more normal portion of its vertical movement.

Means is provided for introducing the fluid treating agent at a position underlying the trailing edge of the colter wheel 122. Such means comprises a blade holder 200 secured to the upper ends of the straps 169 and 170, such blade holder 200 comprising a pair of spaced parallel plates 202 and 204 between which an elongated blade 206 is slidingly disposed for longitudinal reciprocation. Nut and bolt means 208 and 210 secure the plates 202 and 204 together on opposite sides of the blade 206 passing therebetween, such plates being sufficiently yielding so that tightening of the nut and bolt means 208 and 210 clamps the blade 206 in adjusted relation between the plates 202 and 204. Not only does the described arrangement enable the blade 206 to be secured in an adjusted position along its length with respect to the subframe 86, it will also be evident on inspection of FIGURE 3 that sufficient flexibility exists so that the blade 206 can if desired be adjusted angularly to a slight extent about an axis intermediate the nut and bolt means 208 and 210.

The blade 206 (preferably SAE 5610 heat treated, high carbon spring steel) is generally rectangular in cross section and its longitudinal extent is forwardly and downwardly inclined so that its lower extremity is disposed below the trailing edge of the colter wheel 122. The previously described adjustability of the blade 206 relative to the subframe 86 makes it possible to control the vertical position of the lower end of the blade 206 relative to the colter wheel 122. Also, such adjustability enables the blade 206 to be positioned in near tangency to the colter wheel 122. The forward edge 220 of the blade 206 is blunt, rather than being sharp, and can be substantially right angled with respect to the opposite sides of the blade 206. The lower end extremity 222 of the blade 206 terminates in a substantially horizontal plane, and the opposite sides of the blade are laterally enlarged at 224 and 226 immediately adjacent the lowermost extremity 222 of the blade, the arrangement being such that the enlargements 224 and 226 extend horizontally all the way from the leading edge 220 to the trailing edge 228 of the blade 206.

A conduit 230 (preferably of steel for the handling of ammonia and preferably having an external diameter equal to the thickness of the blade 206—5/16" being preferred) is secured to the trailing edge 228 of the blade 206 by welding or the like, such conduit 230 in any event having an external diameter less than the over-all thickness of the blade 206 through the transverse enlargements 224 and 226 thereof. The lower end of the conduit 230 terminates and is closed at a position directly behind or at the same level as the lower edge 222 of the blade 220, and such conduit 230 is provided with lateral diametrically opposed outlet openings 232 immediately trailing the enlargements 224 and 226, the arrangement being such that fluid passing downwardly through the conduit 230 is discharged laterally into the portions of the earth 234 through which the enlarged portions 224 and 226 pass during forward movement of the apparatus 8. The transverse enlargements 224 and 226 are of minor transverse dimensions so as to minimize earth compaction and are preferably just sufficiently large so that they will open a path through the earth through which the lowermost end portion of the conduit 230 can be moved and dirt not be forced into the openings 232 so as to clog the latter.

The blade 206 is preferably of a thickness exceeding that of the marginal portion of the colter wheel 122 so that the inclined blade 206 during forward movement of the apparatus 8 tends to draw the subframe 86 downwardly and "suck" the colter wheel 122 in, especially when the lower end 222 of the blade 206 is below the level of the bottom of the wheel 122. The enlargements 224 and 226 are preferably formed on the blade 206 as welding beads, and can conveniently be formed by the use of electric welding techniques using conventional hard surfacing electrodes. This is particularly desirable inasmuch as the surfaces of the enlargements 224 and 226 are subjected to a substantial wear environment.

Figure 6:
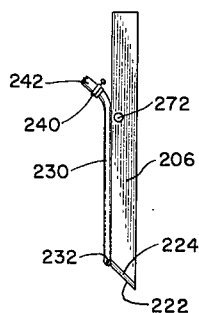
FIGURE 6 is a side elevational view of the blade and the associated conduit and fluid discharging means; and, FIGURE 7 is a front elevational view of the blade and conduit means shown in FIGURE 6.
Figure 7:
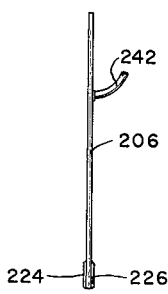

The upper end of the conduit 230 is angled away from the rear edge of the blade 206 as shown best in FIGURE 6 and is provided with a conventional hose clamp 240 and is thereby coupled to a flexible fluid delivery hose 242. The fluid delivery hose 242 along with fluid delivery hoses 244, 246, 248 and 250 of the units 81, 83, 84 and 85, respectively, are connected by conventional valving and metering means, not shown, to the vessel 24, whereby a fluid treating agent, such as liquid ammonia, contained within the vessel 24 can be controllably and concurrently supplied equally to all the fluid treating units.

Such conventional valving and metering means, as will be understood by those familiar with the art, include a pumping and metering system actuated by rotation of one of the ground wheels 30 or 32 to distribute a treating agent such as ammonia at a rate dependent upon the speed of advance of the apparatus 8. The ground wheels 30 and 32 will normally be in at least light frictional contact with the ground surface 251 during use of the apparatus 8.

A length of chain 260 is connected between the main frame and the blade holder 200 as shown in FIGURE 1, whereby the downward swinging movement of the subframe 86 and consequently the downward swinging movement of the colter wheel 122 is limited relative to the main frame 10. The length of the chain 260 is preferably such that such stopping action occurs prior to the spring 160 becoming disengaged with the flange 20. This arrangement greatly contributes to smoothness of action when the colter wheel 122 may pass over a low or extraordinarily soft spot. Also the chain supports the unit 80 when the support wheels 30 and 32 are lowered.

Although the colter wheel 122 is very thin, and whereas the blade 206 has a minimum thickness commensurate with protection for the conduit 230, there will nevertheless be a residual tendency for the opening in the earth to remain slightly open after passage of the colter wheel 122 and the blade 206. In order that such opening be closed with minimal disturbance to tender young plants, a short length of drag chain 270 is secured to the blade 206 through an opening 272 provided in the latter. Inasmuch as the blade 206 is coplanar with the colter wheel 122, the chain 270 will drag over the opening produced by the colter wheel 122 and the blade 206 and cause loose dirt to seal the opening.

The operation of the apparatus 8 should be readily appreciated by those familiar with liquid fertilizing apparatus. When the apparatus 8 is to be moved to an area of intended use, the wheels 30 and 32 are actuated to the dashed line position shown thereof in FIGURE 1, such effective lowering of the support wheels 30 and 32 relative to the main frame effectively raising the colter wheels of the treating units above the earth's surface, whereby the colter wheels do not engage the ground surface and the apparatus 8 can be readily moved. Upon the apparatus 8 reaching the area of intended use, the valve and metering system associated with the means for supplying treating fluid to the various units such as the hose 242 associated with the unit 80 are set to initiate delivery of treating fluid to the treating units.

Additionally, the hydraulic cylinder 50 is actuated to retract the piston rod 52 and effectively lower the colter wheels relative to the ground wheels 30 and 32. It will be observed that this places the axles of the colter wheels in approximately the same vertical transverse plane of the ground wheels 30 and 32 so that whenever the colter wheels are in earth penetrating position. This arrangement will be best appreciated on reference to FIGURE 1, wherein the dashed line position of the wheel 32 shows the same resting on the ground surface shown by dashed line 280 when the apparatus is in transport (non-operative) position, it being noted that the colter wheel 122 is disposed above the dashed line 280 so that the colter wheels do not contact the ground when the apparatus is being moved to or from an area of use.

When the wheel 32 is moved to its full line position in FIGURE 1 the weight of the apparatus tends to urge the colter wheel 122 and the blade 206 into the ground surface 251, and with advance of the apparatus 8 the colter wheel 122 and the blade 206 penetrate the earth until the wheels 30 and 32 contact the earth surface 251 (FIGURE 1 shows such penetration prior to the wheels 30 and 32 contacting the ground surface 251); however, it must be understood, depending upon ground hardness and other such factors, that the wheels 30 and 32 can contact the surface 251 without advance of the apparatus 8 being required merely on movement of the wheels from the dashed to full line positions thereof.

In any event, depending on the length of the chain 260 (which can if desired be adjustable in length) and the vertically adjusted ground wheel position, the colter wheels are yieldingly urged into the ground to a maximum depth extent limited by the chain 260 and wheel positions. As mentioned previously, such penetration is aided by the inclination and blunt thickness of the blade 206.

When the wheels 30 and 32 are raised so that the colter wheels penetrate the earth and the ground wheels are in earth surface contact, the axles of all such wheels are in essentially the same transverse vertical plane despite substantial vertical swinging movements of the subframes, whereby the apparatus 8 can be sharply turned without subjecting the ground wheels to substantial lateral sliding movement or subjecting the colter wheels to excessive lateral stresses. Short turns can be therefore made at the ends of fields without withdrawal of the colter wheels being necessary.

An important advantage of the apparatus 8 resides in the fact that each individual treating unit can readily raise above and roll without damage over an obstruction such as a rock, or accommodate its vertical position to high and low areas (as encountered in terraced or rough fields) without substantially affecting the independent operation of adjacent treating units. This fact coupled with the turning capability of the apparatus makes wide equipment of many treating units (even equipment with a plurality of treating units outboard of the ground support wheels) capable of treating a wide field swath in a single pass a practical reality.

It is important that each treating unit can be easily and independently removed and replaced, with the result that the apparatus 8 can suffer an absolute minimum of down time during the very limited periods during which many types of treating agents can be used for maximum effectiveness.

Manifestly the illustrated and described embodiment of the invention is susceptible to numerous variations in detail without departing from the spirit of the invention. Accordingly, attention is directed to the appended claims in order to ascertain the actual scope of the invention.

I claim:

1. In agricultural apparatus for subsurface introduction of treating fluids into the earth, the improvement comprising a main frame, a pair of axially aligned, axially spaced, ground support wheels mounted for vertical movement on said main frame, means for vertically moving said support wheels relative to the main frame and for securing said support wheels in a selected vertically adjusted position, a plurality of treating units carried by the main frame, such units being disposed along the main frame at positions spaced in parallelism to the axis of the support wheels with such units being located intermediate and at both sides of the pair of support wheels, each of said units being comprised of a subframe disposed below the main frame, such subframe being generally horizontally disposed and elongated in a direction at right angles to the axis of the support wheels, said subframe having forward and rear ends with the same being pivoted for vertical swinging movement to the main frame adjacent the forward end of the subframe with such pivotal connection being substantially forward of the axis of the support wheels throughout vertical movement of the rear end of the subframe relative to the main frame, spring means for urging downward swinging movement of the rear end of the subframe relative to the main frame means for limiting downward swinging movement of the rear end of the subframe relative to the main frame, a generally flat colter wheel mounted on the subframe about a horizontal axis approximately as advanced relative to the main frame as the axis of the support wheels, said colter wheel having a sharp-edged periphery and being of an axial thickness not exceeding about one-half inch thickness along every radius thereof from a position spaced from the axis of the colter wheel a distance not exceeding two-thirds of the maximum radial extent of the colter wheel to the sharp-edged periphery thereof, a depending blade carried by the subframe rearwardly of and coplanar with the colter wheel, said blade being forwardly and downwardly inclined and projecting below the adjacent and trailing edge of the colter wheel, fluid conduit means carried by the blade having an outlet adjacent the lowermost extremity of the blade, a treating fluid storage vessel carried by the main frame, and means coupling the vessel to all the conduit means of the treating units for delivering a treating fluid to such conduit means.

2. The combination of claim 1, wherein said spring means comprises an elongated leaf spring disposed in general parallelism to the subframe and having forward and rear ends, means securing the spring adjacent its forward end to the subframe, and said spring bearing downwardly on the subframe adjacent its latter end and bearing upwardly on the main frame intermediate its ends.

3. In agricultural apparatus for subsurface introduction of treating fluids into the earth, the improvement comprising a frame means and a pair of axially aligned, axially spaced, ground support wheels therefor, a plurality of treating units carried by the frame means, such units being disposed along the frame means at positions spaced in parallelism to the axis of the support wheels with such units being located intermediate and at both sides of the pair of support wheels, each of said units being comprised of a subframe disposed below the frace means, such subframe being generally horizontally disposed and elongated in a direction at right angles to the axis of the support wheels, said subframe having forward and rear ends with the same being pivoted for vertical swinging movement to the frame means adjacent the forward end of the subframe with such pivotal connection being substantially forward of the axis of the support wheels throughout vertical movement of the rear end of the subframe relative to the frame means, spring means for urging downward swinging movement to the rear end of the subframe relative to the frame means, means for limiting downward swinging movement of the rear end of the subframe relative to the frame means, a generally flat colter wheel mounted on the subframe about a horizontal axis approximately as advanced relative to the frame means as the axis of the support wheels, said colter wheel having a sharp-edged periphery and being of an axial thickness not exceeding about one-half inch thickness along every radius thereof from a position spaced from the axis of the colter wheel a distance not exceeding two-thirds of the maximum radial extent of the colter wheel to the sharp-edged periphery thereof, a depending blade carried by the subframe rearwardly of and coplanar with the colter wheel, said blade being forwardly and downwardly inclined and projecting below the adjacent and trailing edge of the colter wheel, fluid conduit means carried by the blade having an outlet adjacent the lowermost extremity of the blade, a treating fluid storage vessel carried by the frame means, and means coupling the vessel to all the conduit means of the treating units for delivering a treating fluid to such conduit means.

4. The combination of claim 3, wherein said blade is substantially straight and has an inclined forward edge defining an inclined line, said blade being mounted on the subframe for movement along the inclined line, means for and normally securing the blade in a selected position against movement relative to the subframe along said inclined line, and said blade having the forward edge thereof positioned in near tangency to the periphery of the wheel.

5. The combination of claim 3, wherein the outer periphery portion of the wheel is of corrugate configuration with the valleys and ridges defined by said corrugate configuration being radially disposed.

6. The combination of claim 3, wherein the colter wheel is of uniform radius throughout its circumferential extent, and wherein the wheel is flat throughout the outer portion of its radial extent.

7. The combination of claim 3, wherein said blade has a blunt forward edge of greater transverse thickness than the outer portion of the wheel, whereby trash encountered by such blunt forward edge of the blade tends to be deflected upwardly and rearwardly of the blade.

8. The combination of claim 7, wherein said blade at its lower end is provided with a transverse enlargement directly forward of said outlet.

References Cited by the Examiner

UNITED STATES PATENTS

| | | | |
|---|---|---|---|
| Re. 25,307 | 12/1962 | Johnston | 111—6 |
| 272,254 | 2/1883 | Hornbeck | 172—657 |
| 1,844,124 | 2/1932 | Jordan | 172—316 X |
| 2,658,463 | 11/1953 | Jaeger | 111—85 X |
| 2,684,617 | 7/1954 | Johnston | 111—7 X |
| 2,827,005 | 3/1958 | Calkins | 111—7 |
| 2,849,969 | 9/1958 | Taylor | 111—7 |
| 2,908,338 | 10/1959 | Hanrahan | 172—166 X |
| 2,924,187 | 2/1960 | Zimmerman | 111—7 |
| 3,092,052 | 6/1963 | Andersen | 111—7 |

ABRAHAM G. STONE, *Primary Examiner.*

W. A. SMITH, III, *Assistant Examiner.*